(12) United States Patent
Nur et al.

(10) Patent No.: US 12,037,505 B2
(45) Date of Patent: Jul. 16, 2024

(54) DIGITAL SOL-GEL MULTIFUNCTIONAL WATER BASED INKS

(71) Applicant: NUR INK INNOVATION LTD, Rosh-ha-Ayin (IL)

(72) Inventors: Moshe Nur, Magshimim (IL); Muhammad Iraqi, Tira (IL)

(73) Assignee: NUR INK INNOVATIONS LTD, Magshimim (IL)

( * ) Notice: Subject to any disclaimer, the term of this patent is extended or adjusted under 35 U.S.C. 154(b) by 53 days.

(21) Appl. No.: 17/788,120

(22) PCT Filed: Dec. 15, 2020

(86) PCT No.: PCT/IL2020/051290
§ 371 (c)(1),
(2) Date: Jun. 22, 2022

(87) PCT Pub. No.: WO2021/130744
PCT Pub. Date: Jul. 1, 2021

(65) Prior Publication Data
US 2023/0060189 A1    Mar. 2, 2023

Related U.S. Application Data
(60) Provisional application No. 62/952,656, filed on Dec. 23, 2019.

(51) Int. Cl.
C09D 11/54    (2014.01)
B41M 5/00     (2006.01)
C09D 11/322   (2014.01)

(52) U.S. Cl.
CPC .......... C09D 11/54 (2013.01); B41M 5/0023 (2013.01); C09D 11/322 (2013.01)

(58) Field of Classification Search
CPC ....... C09D 11/54; C09D 11/322; C09D 11/30; B41M 5/0023
See application file for complete search history.

(56) References Cited

U.S. PATENT DOCUMENTS

| | | |
|---|---|---|
| 6,020,397 A | 2/2000 | Matzinger |
| 2006/0036001 A1 | 2/2006 | Oyanagi et al. |
| 2007/0103529 A1 | 5/2007 | Pearl et al. |
| 2007/0104899 A1 | 5/2007 | Pearl et al. |
| 2007/0172608 A1 | 7/2007 | Tojo et al. |
| 2013/0162722 A1 | 6/2013 | Brust et al. |

FOREIGN PATENT DOCUMENTS

| | | |
|---|---|---|
| CN | 110418719 A | 11/2019 |
| WO | 01/32789 A1 | 5/2001 |
| WO | 2018/138720 A1 | 8/2018 |

*Primary Examiner* — Lisa Solomon
(74) *Attorney, Agent, or Firm* — BROWDY AND NEIMARK, PLLC

(57) ABSTRACT

The invention generally concerns a sol-gel digital inkjet printing process for forming a pattern on a surface region, the process comprising applying a formulation on the surface region, the formulation comprising a silanol functionalized polymer and a polymer-free pigment dispersion, said applying being under conditions permitting formation of particles formed of the silanol functionalized polymer, and curing said particles to form a continuous pattern.

18 Claims, 2 Drawing Sheets

DIGITAL SOL-GEL MULTIFUNCTIONAL WATER BASED INKS

TECHNOLOGICAL FIELD

The invention generally concerns low temperature processes and compositions for inkjet printing.

BACKGROUND

Digital printing enhancement for both digital and offset printing typically involves forming a UV curable polymer film, applied selectively on a surface of a printed substrate, by e.g., embedding and affixing the polymer on the top of the printed image film which is bonded to the substrate, giving the finished printed image/character high glossiness with real 3D effects. Adherence of the film is typically achieved by forming physical bonds between the ink film (formed by chemical bonding (crosslinking) between the functional groups in the material/binder of the ink film) and the corresponding functional groups in the substrate. The film comprises a binder or a binder mixture, a carrier and additives such as crosslinking agents and adhesion promoting agents, collectively referred to herein as an ink film. The film, when polymerized/crosslinked, for example, with the aid of a crosslinking agent, upon exposing the mixture to heat or other forms of energy, undergoes drying; a step of the printing process referred to as curing.

3D enhancement adds a third dimension atop two-dimensional printed patterns to increase the visual impact of the message and the perceived value of the printed pattern. It can also print design and texture elements that entice the viewer to touch the pattern. By stimulating the desire to touch an image, digital enhancement can increase the viewer's attention to and memory of the printed item. Digital enhancement enables the printing of embossed images that can vary from one print to the next, and cost-effective short-run 3D enhancement.

Digital 3D enhancement resides between 2D digital printing and 3D fabrication, namely Additive Manufacturing (AM). Like 2D printing, its primary task is graphic, albeit offering the potential for enhancing substrate structure and function. Like 3D fabrication, it is typically printed in multiple layers, but unlike it, 3D enhancement does not aim to produce objects thicker than a fraction of a millimeter.

Currently available 3D enhancement printing systems employ a UV-curable ink. Most systems use LED curing or a combination of LED and Mercury bulb curing to polymerize the ink. Enhancement inkjet systems use printheads that can produce relatively large drops either through binary mode—as with the Dimatix Nova heads on the Scodix S-series printers—or through grayscale printheads, as with those on the Scodix Ultra, MGI JET varnish UV, Roland, Mimaki, Direct Color Systems, Autobond and other systems. UV-LED-cured inks enable the printing of 3D layers that can be significantly thicker than achievable with solvent or aqueous-based inks. Systems that scan the printhead back and forth over the substrate or move the substrate back and forth under the printhead can add height with multiple layers of ink. Pinning or curing a UV ink when it arrives at the substrate surface and has not had time to flow out, will freeze the deposit at a greater height than if allowed to flow out. Columns of clear dots frozen on deposit will scatter light producing a matte to satin appearance. Subsequent clear layers allowed to flow atop and between the first layer of dots will also constrain the subsequent layer's outward edges, producing a gloss finish. Initial layers that are allowed to flow will produce a gloss finish on smooth substrates. While most 3D enhancement systems use clear varnish to produce embossed effects, Direct Color Systems and Dainippon Screen build their embossed effects using white and other print colors. Those are composed of monomers, oligomers and photoinitiators which are not environmentally friendly in many aspects and cannot be contacted with food, as is the case with water based inks, such as polyurethanes that are FDA allows only indirect contact with food. In many cases those UV varnishes are hard and brittle, and when bended they easily crack.

Printing problems associated with inkjet printing of low viscosity liquid inks directly on absorptive substrates, such as uncoated paper, textile and garments, are well known, and there have been several suggested solutions. These include, for example, an ink receptive layer that absorbs the ink drops while minimizing their bleeding, and multi-part ink compositions, which are based on contacting an immobilizing composition and a colored ink composition on the surface of an untreated substrate. Due to chemical incompatibility, the colored ink composition is stabilized on the substrate, thereby minimizing feathering and penetration thereof into the absorptive substrates.

Direct inkjet printing of pigments on untreated fabrics has enjoyed the improvements provided by the suggested technologies, since the emulsified and suspended pigment particles are required to be bound to the substrate by means of a film-formed by ink binders that encapsulates the pigment particles while adhering to the substrate, and in cases where the substrate is not white, the process is supplemented by an opaque white base layer. The technologies employ the use of emulsified film-forming binders and/or dispersants of the suspended pigment particles, by utilizing property-sensitive variants of these ingredients, wherein these ingredients tend to lose their compatibility in the ink's medium, and thereby cause coagulation of the ink composition when contacting with an acid which is defined as a property-adjusting agent on the surface of the substrate. In addition, these technologies are based on the ability to form mainly physical bonds and minor chemical bonds by crosslinking the various ingredients of the film amongst themselves and with the substrate, which are obtained by using an internal self-crosslinking mechanism which cures and crosslinks the film at elevated temperatures.

In the waterborne inkjet printing industry there is an increased need of one-component "1-K" ink system that forms a flexible elastic, chemically crosslinked ink film, well adhered to flexible substrates and/or absorptive substrates, particularly to fabrics and flexible packaging, through instant chemical bond formation (3D crosslinking) at low temperatures, e.g., room temperature, between the reactive functional groups in the film amongst themselves and with the corresponding reactive functional groups in the substrate. These requirements are particularly important when attempting to print color images on absorptive dark textiles while maintaining a high image printing quality without printing negative phenomena like feathering or bleeding. Additionally, very low temperature, instant curing/crosslinking of the digitally printed images on fabrics, particularly synthetic/and or highly elastic synthetic blended colored fabrics, is very important wherein the dye in the synthetic fabric is of the typical type that becomes loose under elevated temperatures, and prone to migrate. This problem, known as dye migration, renders the colors of the image tinted with the color of the substrate, since the dye migrates during the curing step, and mix with the freshly printed image. In case where the image printing process is supplemented with an opaque white under-base later, the white under-base becomes tinted with the dye migrating from the substrate therein, bleeding to the colors that are printed on top of it.

REFERENCES

[1] U.S. patent application Ser. No. 11/588,277
[2] U.S. patent application Ser. No. 11/606,242
[3] WO 2018/138720

GENERAL DESCRIPTION

The inventors of the technology disclosed herein have developed an ink formulation based on a polymer-free water-based pigment dispersion and a printing process that provides a printed pattern that is stable, does not shrink after curing and maintains a strong and long lasting association with any surface material.

The inventors provide formulations of clear and color inks and processes for inkjet printing of the ink formulations on blank substrates as well as on pre-printed or pre-formed patterns and images. As demonstrated herein, the printed formulations of the invention provide the user with the ability to achieve low temperature ink curing, while preventing the ink from smearing or being absorbed by the substrate and further preventing the patterned image from shrinking or undergoing deformation. The ink remains on top of the substrate or the pre-printed pattern, e.g., item/image, without causing or resulting in ink bleeding during the printing step.

The innovative technology provided herein based on a self-crosslinking polymer that may be cured or crosslinked at temperatures as low as room temperature (RT). The polymer is modified or decorated/functionalized with functional pendant groups such as silanol groups that, following application of the polymer, while undergoing drying (hot air, heating chamber or by any other means), thermal curing (including IR, NIR, irradiation, heating chamber, heat press) or curing by any other means, form siloxane covalent linkages. Without wishing to be bound by theory, this low temperature self-crosslinking polymer condensation reaction, which causes the ink to coagulate or gel (to form 3-D gel networks) is triggered by dehydration-drying through water absorption or by water evaporation through curing. The crosslinking reaction of the polymer in the ink is further strongly accelerated or catalyzed upon contact with an aqueous acidic or basic solution at a pH range between 2 and 8. The condensation/crosslinking reaction proceeds at a low pH, e.g., pH 4-5, for example when organic acids such as carboxylic acids are used. The condensation reaction at a low pH of 4-5 is reflected by short 3D gelation times of the ink. The condensation reaction proceeds at an elevated pH where the gelation times are observed to increase, the condensation reactions proceed but gelation does not occur. In this pH regime, particles are formed to a critical size where they become stable due to mutual repulsion effects. Under slightly basic conditions, e.g., pH 7-8, for example when organic amines are used, optionally in the presence of salts condensation reaction proceeds, resulting in a fast gelation of the ink (short gel time). Crosslinking may additionally or alternatively be achieved or accelerated by the addition and use of at least one organometallic material.

As may be understood from the disclosure provided herein, formulations of the invention may be used to form an ink pattern on dry or wet surfaces. For example, crosslinking of an ink polymer used in an ink formulation of the invention, leading to gelation and fixation, as disclosed herein, may additionally or alternatively be achieved by printing the ink formulation on a solid and dry pattern pre-formed of a combination of at least one anti-bleeding polymer and at least one salt. Thus, printing sets and formulations of the invention include:

1) Functional ink formulations which comprise an ink component and a catalyst component enabling gelation and fixation of the ink component, wherein the catalyst is provided in the ink formulation in an inactive form and may be activated on the surface after printing; or
2) Ink formulations and solid catalyst formulations enabling (in combination) wet-on-dry printing; or
3) Ink formulations and liquid catalyst formulations enabling (in combination) wet-on-wet printing.

As demonstrated herein, in comparison to formulations of the art and printed patterns provided thereby, formulations of the invention may be applied on a dry pretreated surface. Formulations of the invention and methods of their use do not result in printed patterns that undergo shrinkage and deformation after curing. This lack of deformability is achieved by providing formulations which utilize polymeric materials that are substantially fully functionalized by silanol groups. The use of fully silanol modified or activated polymers, without using further un-modified or non-activated polymers (namely polymers that are free from any silanol groups), or polymers wherein the amount of silanol groups is between 0.01 and 0.2 mmol/gr, or between 0.05 and 0.1 mmol/gr (in some embodiments, such that the polymer is free of hydroxyl groups and the number of carboxylic acid groups is around or below 1%), allows for efficient crosslinking and avoids post curing pattern deformation.

Unlike formulations of the art, e.g., [3], formulations according to the invention provide complete silanol functionalization or substantially complete functionalization that is essential for achieving a high cross-linking density in relatively difficult curing conditions of low curing temperature (as high as 100° C.) and short curing times (10-15 minutes). Where such a complete functionalization is not provided, longer curing times are typically required and a reduced mechanical stability is observed. Without wishing to be bound by theory, this is true since high silanol crosslinking occurs not only within the film, thus achieving a mechanically strong film, but also between the film and the substrate. A mechanically strong film and an efficient chemical adhesion endow, together, high film durability towards abrasion and scratch, especially when sensitive substrates such as polyester fabrics are concerned.

Against the existing understanding that complete functionalization is expected to result in a too strong chemical bonding and further that complete functionalization can yield deformation of the printed pattern, the inventors have demonstrated that by increasing crosslinking density, in the absence of a further un-modified or a non-activated polymer (namely in the absence of polymers that are free from any silanol groups), shrinkage and pattern deformations are avoided.

The use of a water based polymer-free pigment dispersion in formulations of the invention further assists in obtaining a stable and un-deformable pattern. Where a polymer is present (see for the purpose of comparison [3]), the polymer, acting as a dispersant, attaches to pigment particles present in the ink formulation, thereby increasing the particles' free volume, and consequently increasing the pattern sensitivity to external stress. However, in formulations of the invention, in the absence of a polymer, free volumes existing between pigment particles are reduced and mechanical deformations are prevented or minimized.

In providing a substantially fully silanol modified or activated polymer and in the absence of a polymer material in the pigment dispersion ink, as defined herein, ink formulations of the invention can be provided as stable sol-solutions that can be digitally printed.

Thus, the invention provides a sol-gel digital printing process, utilizing a functional ink that is not only generic in terms of the printing characteristics it provides, but also in terms of its functionality under a broad spectrum of processing conditions (e.g., pH and polymers).

The invention therefore provides a sol-gel digital inkjet printing process for forming a pattern on a surface region, the process comprising applying an inkjet formulation comprising a silanol functionalized polymer on the surface region, under conditions permitting formation of (sol) particles of the (fully) silanol functionalized polymer, and curing said particles to form a continuous pattern, the formulation comprising a polymer-free pigment dispersion.

The invention further provides a sol-gel digital inkjet printing process for forming a pattern on a surface region, the process comprising applying a formulation on the surface region, the formulation comprising a silanol functionalized polymer and a polymer-free pigment dispersion, said applying being under conditions permitting formation of particles formed of the silanol functionalized polymer, and curing said particles to form a continuous pattern The silanol functionalized polymer is a polymer that has been modified or activated with a plurality of silanol groups or functionalities. The functionalized polymer is said to be a "modified or activated polymer" as the polymer substantially comprises no free hydroxyl functionalities or groups and wherein the amount of carboxylic acid groups is below or around 1%. In such a modified or activated polymer, all or substantially all hydroxyl groups have been replaced or functionalized by silanol functionalities. Accordingly, the amount of silanol groups in a polymer used according to the invention is between 0.01 and 0.2 mmol/gr or between 0.05 and 0.1 mmol/gr.

In some embodiments, the amount of silanol groups in a polymer used according to the invention is between 0.01 and 0.2 mmol/gr, between 0.01 and 0.1 mmol/gr, between 0.01 and 0.05 mmol/gr, between 0.02 and 0.2 mmol/gr, between 0.02 and 0.1 mmol/gr, between 0.03 and 0.2 mmol/gr, between 0.03 and 0.1 mmol/gr, between 0.03 and 0.05 mmol/gr, between 0.04 and 0.2 mmol/gr, between 0.04 and 0.1 mmol/gr, between 0.05 and 0.2 mmol/gr or between 0.05 and 0.1 mmol/gr.

In some additional embodiments, the ink formulation comprises the silanol functionalized polymer and is free of any other polymer that does not contain silanol functionalities.

In some embodiments, formulations of the invention comprise a polymeric material, the polymeric material consisting at least one silanol functionalized polymer.

Without wishing to be bound by theory, the sol-gel process of the invention may be regarded as a wet- or a solid-chemical process that involves formation of an inorganic colloidal suspension (sol) and subsequent gelation of the sol in a continuous liquid phase (gel) to form a three-dimensional network structure. The suspension is formed, as will be further explained hereinbelow, by causing crosslinking or association of the silanol functionalized polymer or polymer chains into a colloidal mass that upon further treatment or following pretreatment results in a 3D continuous network, being the printed pattern.

In some embodiments of the sol-gel digital printing process of the invention, an inkjet ink formulation set is utilized that is binder-free (and/or polymer-free, as disclosed) and which comprises
at least one low-temperature curing self-crosslinking silanol functionalized polymer, as disclosed herein (e.g., polyurethane, polyether, polyacrylate, and others),
a catalyst in the form of: (i) an organometallic material, or (ii) a latent acid or a liquid acid, or (iii) a latent base or a liquid base, or (iv) an anti-bleeding polymer in combination with at least one salt, wherein the latent acid or latent base is provided in an amount and/or a form to provide a pH of between 2 and 8 (upon conversion of the latent acid or latent base to an acid or a base, respectfully).

Thus, the invention further provides an ink formulation set comprising (a) at least one low-temperature curing self-crosslinking polymer selected from silanol functionalized polymer, and (a) a catalyst in the form of: (i) an organometallic material, or (ii) a latent acid or a liquid acid, or (iii) a latent base or a liquid base, or (iv) an anti-bleeding polymer in combination with at least one salt, wherein the latent acid or latent base is provided in an amount and/or form to enable a pH of between 2 and 8, wherein the formulation set is free of a binder and optionally further free of a non-silanol functionalized polymer.

In some embodiments, the catalyst is provided as a liquid or a solid formulation. In some embodiments, the catalyst formulation is a liquid formulation comprising a liquid acid or a liquid base.

In some embodiments, the catalyst formulation is provided in combination with the functionalized polymer and the catalyst is a latent acid or a latent base.

In some embodiments, the catalyst formulation is a solid formulation comprising at least one anti-bleeding polymer in combination with at least one salt.

As used herein, the "anti-bleeding polymer" is at least one polymeric material that when applied to a surface, it prevents bleeding or smearing of an ink pattern formed thereon. The anti-bleeding polymer may be selected to prevent bleeding or movement of the ink drop once applied, to thereby prevent distortion of a printed pattern, mixing of inks of different colors and loss of resolution and print quality. The anti-bleeding polymer may be a neutral polymer, a cationic polymer or an amphiphilic polymer, as known in the art. The selection of a specific polymer may depend on the ink formulation that is used, the nature of the substrate onto which the anti-bleeding polymer is to be applied, on the printing method (e.g., wet-on-dry or wet-on-wet) as well as on other parameters known to a person versed in the art. The polymers may thus be selected from a variety of polymer families. Non-limiting examples of such polymers include polyurethanes, cellulosic materials, polyacrylates and others.

In some embodiments, the anti-bleeding polymer is at least one polyurethane. In some embodiments, the anti-bleeding polymer is provided as a mixture of polymers or of polymers with one or more other components.

In some embodiments, the polyurethane is used in combination with at least one salt, such as a calcium salt. The combination may comprise the polyurethane or any other anti-bleeding polymer in an amount between 0.5 and 15 wt %. The amount of the salt may be from 1 to about 6 wt %.

In some embodiments, the at least one salt is selected from monovalent metal salts, divalent metal salts, trivalent metal salts and combinations thereof. The metal may be sodium, calcium, aluminum, copper, zinc, cobalt, nickel, magnesium and others. In other embodiments, the salt is an ammonium salt or an organic salt.

The anion used as the counter ion can be, for example, a chloride, a fluoride, a bromide, an iodide, a nitride, a sulfate, acetate, a citrate, a propionate, a borate or phosphate. Examples of suitable salts of monovalent cations include, but are not limited to, lithium chloride, lithium acetate, lithium carbonate, lithium borate, lithium nitrate, lithium phosphate, sodium chloride, sodium acetate, sodium carbonate, sodium borate, sodium nitrate, sodium phosphate, potassium acetate, potassium chloride, potassium carbonate, potassium borate, potassium phosphate, potassium nitrate, copper chloride, copper nitride, copper sulfate, copper acetate, copper citrate, copper propionate, copper borate, copper phosphate, silver chloride, silver nitride, silver sulfate, silver acetate, silver citrate, silver propionate, silver borate, silver phosphate, gold chloride, gold nitride, gold sulfate, gold acetate, gold citrate, gold propionate, gold borate, and gold phosphate. Examples of suitable salts of divalent cations include, but are not limited to, magnesium chloride, magnesium acetate, magnesium carbonate, magnesium borate, magnesium nitrate, magnesium phosphate, calcium chloride, calcium acetate, calcium carbonate, calcium borate, calcium nitrate, calcium nitrate, calcium phosphate, zinc chloride, zinc acetate, zinc carbonate, zinc nitrate, zinc phosphate, copper chloride, copper acetate, copper carbonate, copper nitrate, copper phosphate, tin chloride, tin acetate, tin carbonate, tin nitrate, tin phosphate, ferrous chloride, ferrous acetate, ferrous carbonate, ferrous nitrate, ferrous phosphate, and combinations thereof. The anti-smear agent can include a combination of compounds having monovalent and/or divalent cations. For example, the anti-smear agent can include lithium and sodium, for example, in the form of lithium chloride and sodium acetate. Other combination of monovalent and/or divalent cations can also be included to provide the anti-bleeding combination.

In some embodiments, the salt is a calcium salt. Non-limiting examples of calcium salts include $CaCl_2$, $CaF_2$, $CaBr_2$, $CaI_2$, calcium carbonate and others.

In some embodiments, the ink formulation set further comprises fumed nano silica, e.g., hydrophobic fumed nano silica.

As the formulation set is suitable for inkjet printing, it may be alternatively used in a variety of printing process, not only in processes disclosed herein. Thus, the invention provides an inkjet ink formulation set comprising at least one low-temperature curing self-crosslinking silanol functionalized polymer, as disclosed herein (e.g., polyurethane, polyether, polyacrylate, and others), a catalyst in the form of: (i) an organometallic material, or (ii) a latent acid, or (iii) a latent base, or (iv) an anti-bleeding polymer in combination with at least one salt, wherein the latent acid or latent base is provided in an amount and/or form to provide a pH of between 2 and 8 (upon conversion of the latent acid or latent base to an acid or a base, respectfully).

Inks of the invention, as further disclosed herein, are unique, not only in their ability to form stable patterns on a vast variety of substrates, but also in the collection of attributes and characteristics pictorially depicted in FIG. 1.

As used herein, a "latent" acid or base is a compound that decomposes upon exposure to a stimulus such as heat or light or upon exposure to suitable reaction conditions, e.g., hydrolysis, to provide an acid or a base. Latent acids or bases may be solids or liquids at room temperature and may be used in liquid catalyst formulations as well as in solid catalyst formulations, as may be the case. Exemplary latent acids include, but are not limited to, esters, sulfonic acid esters, fluorinated sulfonic acid esters, phosphonic acid esters and nitriles. The latent base may be selected amongst metal oxides which yields an alkaline material under suitable reaction conditions. Such latent bases may be selected from oxides of alkali or alkaline earth-metals such as barium oxide, calcium oxide, lithium oxide, or magnesium oxide.

The organometallic material used in a formulation of the invention as a catalyst for initiating or accelerating the crosslinking reaction may be based on a metal selected from zinc, tin, bismuth, iridium, cobalt and others. In some embodiments, the organometallic catalyst is tin based. Tin organometallic compounds include dialkyltin compounds, e.g., dibutyltin diacetylacetonate and dioctyltin diacetylacetonate; dibutyltin dilaurate; dibutyltin bis-(2,3-dihydroxypropylmercaptide); dibutyltin bis-(2-hydroxyethylmercaptide); dibutyltin bis-(4-hydroxyphenylmercaptide); dioctyltin bis-(2-hydroxyethylmercaptide); dioctyltin bis-(4-hydroxybutylmercaptide); dibutyltin bis-(4-hydroxyphenylacetate); dibutyltin bis-[3-(4-hydroxyphenyl)propionate; dioctyltin bis-(4-hydroxyphenylacetate); dioctyltin bis-(3-hydroxybutyrate); diphenyltin bis-(3-hydroxybutyrate); diphenyltin; and others.

The invention further provides an inkjet formulation set comprising:
 an ink formulation comprising at least one low-temperature curing self-crosslinking polymer selected from silanol functionalized polymer, as disclosed herein (e.g., polyurethane, polyether, polyacrylate, and others);
 a catalyst formulation comprising one of: (i) a liquid acid, (ii) a liquid base, (iii) an anti-bleeding polymer in combination with at least one salt; formulated to a pH between 2 and 8; and (iii) at least one organometallic material; and
 an aqueous carrier.

Ink formulations and ink sets of the invention are configured for combined or separate applications of the ink component (the ink formulation) and the catalyst component (catalyst formulation). Where combined jetting of the formulations is desired, the two formulations (ink and catalyst) may be combined prior to jetting. Where the two formulations are configured for separate applications, the catalyst formulation is typically applied to a surface region before the ink formulation, with the ink formulation being applied on the surface region on which the catalyst formulation was applied. Thus, the catalyst formulation may be used as a pre-treatment formulation.

In some embodiments, the catalyst formulation is applied to the surface on which printing is desired and allowed to completely dry. The catalyst formulation may comprise a water dispersible anti-bleeding polymer or mixture of polymers. In some embodiments, the polymer or polymer mixture comprises at least one polyurethane. The anti-bleeding polymer is typically provided in combination with at least one salt such as calcium chloride or calcium fluoride, wherein, in some embodiments, the amount of the anti-bleeding polymer is between 2-10 wt % of the total weight of the formulation and the amount of the salt is between 0.5-5 wt % of the total weight of the formulation.

In some embodiments, the catalyst formulation comprises a liquid mixture (in an aqueous medium) of anti-bleeding polymers in combination with at least one salt. The formulation is configured for spraying or jetting on a surface region prior to application or jetting of the ink formulation.

In some embodiments, the catalyst formulation is allowed to dry prior to the application of the ink formulation.

In some embodiments, the catalyst formulation is configured as a liquid mixture of anti-bleeding polymers and at least one salt to reduce or diminish or eliminate ink bleeding (which reduction can lead to sharp prints), to bind pigmented inks permanently onto substrate surfaces, to improve color intensity of the pigment prints, to improve fastness of dry and wet rubbing of pigment prints and/or to eliminate shrinkage in heat sensitive substrates.

One or both of the ink formulation and catalyst formulation in a formulation set of the invention may further comprise at least one additive selected from wetting surfactants and at least one additive selected from dispersing agents, preservatives, anti-shrinkage agent (such as epichlorhydrin-modified polyamide), etc. Typically, the ink formulation is free of additional crosslinking agents, other than the low-temperature curing self-crosslinking polymer. Where a crosslinking agent is added it may be selected from water dispersible polyisocyanates, wherein the amount thereof depends on the amount of the polymer. In most general terms, the crosslinking agent may be present in an amount between is 0.5-2 wt % of the total weight of the formulation.

In some embodiments, the inkjet ink formulation is provided as a complete formulation (mixture) comprising all recited components, or as an ink set comprising a formulation of the functionalized polymer, separately from the at least one aqueous catalyst formulation. The functionalized polymer and the aqueous catalyst formulation may be printed, e.g., by inkjet printing, simultaneously or one after the other, as suggested herein.

The ink formulation of the invention may be adapted for enhancement of printed patterns, such as printed items/color images formed on a substrate, to thereby enhance the printed pattern and provide a 3D enhanced pattern.

The silanol functionalized polymer is said to be a low-temperature curing, self-crosslinking polymer or a prepolymer that is capable of undergoing crosslinking/condensation and curing in the presence of the at least one catalyst (being water or in the form of an acid or a base and contained in said at least one aqueous catalyst formulation, or in the form of an anti-bleeding polymer in combination with a salt). The polymer is said to be self-crosslinking as crosslinking occurs between the silanol functional groups present on the polymer chains or between silanol functional groups present on the polymer chains of the same polymer and functional groups, such as (OH) or C=O groups on the substrate surface.

The functionalized polymer is further selected to undergo curing (drying while going a chemical reaction (crosslinking) as a result of applying heat/IR/UV energy, or any other means as detailed herein) via crosslinking under low temperatures, namely at temperatures ranging between room temperature (20-35° C.) and 110° C. According to some embodiments, the low temperatures are temperatures below 70° C., or below 60° C., or below 50° C., or below 40° C., or below 30° C. or a temperature between room temperature and 80° C., or a temperature between room temperature and 70° C., or a temperature between room temperature and 60° C., or a temperature between room temperature and 50° C., or a temperature between room temperature and 40° C., or a temperature between room temperature and 30° C.

As disclosed herein, curing may be achieved by a variety of methods. Independent of the particular curing method, curing may be achieved within several minutes. In some embodiments, the curing time is between 1 and 20 minutes, between 5 and 20 minutes, between 10 and 20 minutes, between 10 and 15 minutes, between 5 and 10 minutes or between 15 and 20 minutes.

In some embodiments, the functionalized polymer is selected amongst acidic pH-reactive polymers. In some embodiments, the polymer is selected amongst basic pH-reactive polymers. As used herein, the term pH-reactive polymer refers to a polymer having functional groups, such as silanol reactive groups, which under certain pH conditions undergo accelerated crosslinking. Accordingly, an acidic pH-reactive polymer is one that undergoes accelerated crosslinking under acidic pH. Similarly, a basic pH-reactive polymer is one that undergoes accelerated crosslinking under basic pH. As the pH range effective for achieving crosslinking is between 2 and 8, inclusive, an acidic pH is meant to include a pH between 4 and 7, inclusive, and a basic pH is meant to include a pH between 7 and 8, inclusive.

According to some embodiments, the functionalized polymer is selected amongst those polymers or prep-polymers having a Tg value higher than −70° C. and lower than 400° C. (−70° C.<Tg<400° C.). In some embodiments, the Tg is a low-$T_g$ when measured on the dried/cured film. In some embodiments, the Tg value is in the range 40° C. to 120° C. In some embodiments, for hybrid systems (which comprise a polymer mixture of at least one silanol-activated polymer and a polymer of choice, e.g., an acrylic polymer or a polyester or a co-polymer), polymer combinations may be used to achieve improved properties, e.g., a desired Tg value. For example, a combination of (a) an acrylic copolymer emulsion (e.g., with Tg=−70° C.) and (b) a polyurethane dispersion (e.g., with Tg=40° C.), wherein the acrylic polymer is present in greater amounts.

In some embodiments, the functionalized polymer is selected amongst ether-polyols, poly ethers, ester-polyols, carbonate-polyols, water based acrylics (having carboxyl or hydroxyl group), epoxy polymers, phenolic polymers, polyamide, polyamines, micronized polyethylene waxes, polyurethane (e.g., polyether-type; polyester-type; polycarbonate-type).

In some embodiments, the functionalized polymer is a water-based polyurethane polymer or a water based acrylic polymer having a plurality of pendant/and or end-capping silanol groups and/or carboxylic acid groups.

In some embodiments, the functionalized polymer is a water based polyurethane polymer or a water based acrylic polymer having a plurality of pendant/and or end-capping silanol groups that upon addition into a diluted organic acid solution (0.1%<acid <2%) a 3D well defined spheres (Gels) are formed as well-defined liquid droplets (Sols). In some embodiments, the liquid droplets (Sols) have, on average, a volume of between 1 pico-liter and milliliters. In some embodiments, the Sols are produced by a dispenser or an inkjet Printhead.

In some embodiments, the functionalized polymer is a polyurethane polymer comprising a plurality of pendant/and or end-capping silanol groups. As known in the art, the silanol group is a functional group of the form Si—O—H. The silanol group is produced when alkoxy silane is hydrolyzed with the aid of an acid or a base: Si—OR (hydrolysis)—Si—OH (where OR is an ethoxy group, ethanol is produced). When silanol groups present along the polymer chain or at the ends of the polymer chain undergo condensation, siloxane bonds are formed. While under certain conditions condensation may be achieved by dehydration, acid or base catalysts hastens the condensation reaction and drive it to completion. To achieve effective crosslinking, the alkoxy silanes must hydrolyze to silanol groups effectively. The polymers/polymer moieties must have at least one silanol group, each exposed for condensation. Where the maximum number of hydroxyl groups attached to silicone atom is 3, the silicone atom should have 1 or 2 or 3 silanol groups. This allows an effective elongation of between 100 and 500% relative to the length of the uncondensed polymer.

In some embodiments, the functionalized polymer is a polyurethane comprising a plurality of pendant/and or end-capping carboxylic acid groups. The carboxylic acid groups may be in the form of the neutral acid or in the deprotonated carboxylate (salt) form. The carboxylic groups are selected amongst such groups capable of undergoing crosslinking interactions with various other crosslinking agents or materials such as water dispersible polyisocyanates and others.

In some embodiments, the functionalized polymer is an acrylic polymer having a plurality of silanol groups.

Silanol-modified polymers such as silanol modified polyurethane or silanol-modified acrylates, may be prepared by methods known in the art or may be obtained from commercial sources. Methods of producing silanol-modified polymers and selective examples of such polymers may be found in Momentive, Silquest Silanes, Selector and Handling Guide, MOM-110-009-13E-GL, March 2011, incorporated herein by reference in its entirety.

Functionalization of polymers, monomers or polymers with silanol groups may follow any one or more methodologies known in the art, these include for example "integral blending" methods of the ShinEtsu "Silane Coupling Agents" or Momentive Performance Materials Inc. "Silquest" Silanes with polyurethane or acrylic polymers or mixtures of both.

Silanol-modified polymers may be prepared in advance of carrying out a printing method according to the invention or prior to using a formulation or formulation set according to the invention, or may be made in situ during the printing process. When the silanol modified polymers are made in advance of carrying out a printing method or prior to using a formulation or formulation set, a water based acrylic (with carboxyl or hydroxyl group) or an epoxy or phenolic or polyurethane polymers can be grafted with silanol reactive groups by integrally blending with silanes such as Silquest A-187, WetLink 78 (Momentive Performance Materials Inc). When the silanol-modified polymers are made in situ, a formulation of the invention (e.g., an ink formulation in a formulation set according to the invention) may comprise (instead of comprising the at least one low-temperature curing self-crosslinking polymer) a polymer to be modified, at least one silanolization agent/silane coupling agent such as KBM-403 (3-Glycidoxypropyl trimethoxysilane) or KBE-402 (3-Glycidoxypropyl methyldiethoxysilane) or KBE-903 (3-Aminopropyltriethoxysilane), all being a ShinEtsu and a catalyst formulation.

In accordance with the invention, an ink formulation that comprises the components for in situ formation of the silanol-modified polymer (namely—being the at least one low-temperature curing self-crosslinking polymer) may be delivered to the substrate surface, as disclosed herein, upon which delivery the at least one low-temperature curing self-crosslinking silanol-modified polymer is formed: the silanol-modified polymers are made in-situ (upon delivery to the substrate surface) where the formulation of the invention (e.g., an ink formulation in a formulation set according to the invention) may comprise (instead of comprising the at least one low-temperature curing self-crosslinking polymer) a polymer to be modified like W-5030, W-6110, W-6061, WPB341A and an acidic catalyst formulation that contains at least one of the following VOC free silane coupling agents: X-12-1098, X-12-1135, X-12-1131 or optionally a basic catalyst solution with at least one of the following VOC free silane coupling agents: KBP-90, KBP-64, X-12-1121, X-12-1126.

A general process for the preparation of digital sol-gel inkjet inks and their application according to the invention and of uses thereof in digital printing is provided in FIG. 2.

Formulations of the invention comprise at least one aqueous catalyst formulation that comprises an acid or a base or an anti-bleeding polymer with salts that present a solid alternative to the liquid catalysts. The acid may be selected amongst organic acids or mineral acids. Exemplary acids include glycolic acid, acetic acid, lactic acid, malic acid, ascorbic acid, maleic acid and benzoic acid. An aqueous catalytic acid formulation comprises an acid concentration ranging from 0.1 and 4.0%. Where basic formulations are used, the base may be an organic base or an inorganic base. Non-limiting examples of such bases include amines such as secondary or a tertiary amine, such as triethyl amine (TEA), and tri-n-butylamine. The amount or concentration of the base may range from 0.1 and −4%.

In some embodiments, the anti-bleeding polymer is provided in combination with a salt and a polymer. In some embodiments, the polymer is polyurethane and the salts are of calcium, e.g., calcium chloride or calcium fluoride salts.

According to some embodiments of the invention, the low-temperature curing self-crosslinking silanol functionalized polymer undergoes crosslinking upon dehydration, e.g., by water absorption and possibly thermal-induced evaporation.

The ink formulation may be formulated as an aqueous formulation comprising water and/or a water-miscible organic solvent. In some embodiments, the aqueous carrier is water or a combination of water and a water-miscible organic solvent. Where the carrier is a combination of water and a water-miscible organic solvent, the ratio of the organic solvent to water ranges from 10:100 to 60:100. In some embodiments, the ratio is from 1:100 to 1:1.

According to some embodiments, the water-miscible organic solvent is at least one humectant and/or at least one coalescing agent. Non-limiting examples of humectants include ethylene glycol (EG) and/or glycerin (20-40 wt. %). The coalescing agent may be propylene glycol (PG). Additional examples include dipropylene glycol n-propyl ether, dipropylene glycol n-butyl ether, propylene glycol n-butyl ether, propylene glycol n-propyl ether, ethylene glycol hexyl ether, ethylene glycol propyl ether, diethylene glycol phenyl ether, ethylene glycol phenyl ether, dipropylene glycol n-propyl ether, dipropylene glycol n-butyl ether, propylene glycol n-butyl ether and propylene glycol n-propyl ether.

Formulations of the invention may be formulated to exhibit any desired physical, mechanical or chemical properties, as disclosed herein. In some embodiments, the formulations are formed to exhibit a variety of viscosities, each being useful for an independent application. The viscosities are typically between 3 and 25 cPs. In some embodiments, the viscosity is between 3 and 10 cPs. In other embodiments, the viscosity is between 3 and 6 cPs. In other embodiments, the viscosity is between 10 and 15 cPs. In some embodiments, the viscosity is between 6 and 9 cPs. In some embodiments, the viscosity is between 9 and 15 cPs.

In another aspect, there is provided a clear inkjet ink formulation comprising a silanol-modified polymer, and a carrier, wherein the silanol-modified polymer is configured or selected to undergo crosslinking upon contacting with an acid or a base.

In some embodiments, upon contacting the silanol-modified polymer with an acid or a base, the viscosity increases as 3D crosslinking occurs.

In some embodiments, the silanol-modified polymer is a silanol-modified polyurethane, wherein the number of hydroxyl groups in the silanol groups is at least one. In some embodiments, the number of hydroxyl groups is 1, 2 or 3.

Exemplary formulations of the invention are shown in Tables 1-12 below:

TABLE 1

Example for a general formulation according to the invention:

Material

Glycols
Water
Silanol modified resins/dispersion polymers
Low viscosity, polymer free pigment dispersion
Wetting agent
Fungicide/Bactericide

TABLE 2

A formulation of the invention having low viscosity (3-6 cP)

Material

Glycols
Water
Silanol modified resins/dispersion polymers
CMYKW polymer free pigment dispersion
Wetting agent
Fungicide/Bactericide

TABLE 3

An exemplary formulation of the invention
Material

Glycols
Water
Silanol modified resins/dispersion polymers
Low viscosity CMYKW polymer free pigment dispersion
Wetting agent
Fungicide/Bactericide

TABLE 4

A formulation of the invention having medium viscosity (6-9 cP):
Material

Glycols
Water
Silanol modified resins/dispersion polymers
CMYKW pigment polymer free dispersion
Wetting agent
Fungicide/Bactericide

TABLE 5

An exemplary formulation of the invention:
Material

Glycols
Water
Silanol modified resins/dispersion polymers
Low viscosity CMYKW polymer free pigment dispersion
Wetting agent
Fungicide/Bactericide

TABLE 6

A formulation of the invention having high viscosity (9-15 cP):
Material

Glycols
Water
Silanol modified resins/dispersion polymers
C pigment dispersion
M pigment dispersion
Y pigment dispersion
K pigment dispersion
W pigment dispersion
Anti-shrinkage agent
(e.g., epichlorhydrin-modified polyamide)
Wetting agent
Fungicide/Bactericide

TABLE 7

Example for a general formulation according to the invention:

| Material | % |
|---|---|
| Glycols | 10-60 |
| Water | 20-45 |
| Silanol modified resins/dispersion polymers | 10-35 |
| Low viscosity, polymer free pigment dispersion | 5-30 |
| Wetting agent | 0.0-0.5 |
| Fungicide/Bactericide | 0.0-0.1 |

TABLE 8

A formulation of the invention having low viscosity (3-6 cP)

| Material | % |
|---|---|
| Glycols | 11-18 |
| Water | 37-41 |
| Silanol modified resins/dispersion polymers | 27-29 |
| CMYKW polymer free pigment dispersion | 8-15 |
| Wetting agent | 0-0.25 |
| Fungicide/Bactericide | 0.03-0.1 |

TABLE 9

An exemplary formulation of the invention

| Material | % |
| --- | --- |
| Glycols | 23-29 |
| Water | 24-30 |
| Silanol modified resins/dispersion polymers | 14-16 |
| Low viscosity CMYKW polymer free pigment dispersion | 25-30 |
| Wetting agent | 0-0.25 |
| Fungicide/Bactericide | 0.03-0.1 |

TABLE 10

A formulation of the invention having medium viscosity (6-9 cP):

| Material | % |
| --- | --- |
| Glycols | 21-30 |
| Water | 27-35 |
| Silanol modified resins/dispersion polymers | 27-33 |
| CMYKW pigment polymer free dispersion | 6-15 |
| Wetting agent | 0-0.25 |
| Fungicide/Bactericide | 0.03-0.1 |

TABLE 11

An exemplary formulation of the invention:

| Material | % |
| --- | --- |
| Glycols | 27-32 |
| Water | 20-26 |
| Silanol modified resins/dispersion polymers | 14-16 |
| Low viscosity CMYKW polymer free pigment dispersion | 25-30 |
| Wetting agent | 0-0.25 |
| Fungicide/Bactericide | 0.03-0.1 |

TABLE 12

A formulation of the invention having high viscosity (9-15 cP):

| Material | % |
| --- | --- |
| Glycols | 28-42 |
| Water | 15-23 |
| Silanol modified resins/dispersion polymers | 31-34 |
| C pigment dispersion | 3-5 |
| M pigment dispersion | 5-8 |
| Y pigment dispersion | 8-12 |
| K pigment dispersion | 9-11 |
| W pigment dispersion | 15-25 |
| Anti-shrinkage agent (e.g., epichlorhydrin-modified polyamide) | 0.5-4% |
| Wetting agent | 0-0.25 |
| Fungicide/Bactericide | 0.03-0.1 |

In addition to the clear ink formulations of the invention, there are also provided color ink formulations. The color formulations are similarly used for forming an image on a variety of substrates (e.g., flexible substrates such as fabrics including: cotton, cotton polyester blends, polyester, polyamide, wool, linen, lycra, wool, aluminum, aluminum composites, wood, glass, tempered glass, ceramic tiles, foam board, concrete, plaster; paper substrates such as: blueback paper, wall paper, décor paper, lamination paper; plastics such as: PVC banner, backlit PVC banner, self-adhesive vinyl, PVC-based wall paper, vehicle wrapping self-adhesive vinyl, mesh banner; carpet; leather; flexible packaging such as plastics, nylon, PET and PP), such that the printed ink is instantly chemically 3D crosslinked/3D gelled when contacting the acidic/basic catalyst solution on the surface of the substrate/fabric (acid/base catalyzed surface crosslinking), but not absorbed into the substrate or fabric during the printing step, and the ink printed on the substrate becomes instantly smeared resistant/touch dry and does not bleed or feather.

These properties are obtained by applying a solid or a liquid catalyst formulation to the fabric/substrate that causes the ink composition to gel and surface crosslink upon contact due to its pH condensation/crosslinking catalysis effect, and at the same time deliver a low-temperature curing crosslinking mechanism to the ink composition that affixes the image film to the substrate while avoiding heating it to elevated temperatures.

Thus, according to an aspect of the invention, the aqueous formulations disclosed herein further comprise a pigment and/or a dye. In some embodiments, the pigment or dye is selected from a wide variety of organic and inorganic pigments such as a white pigment, a black pigment, a yellow pigment, a cyan pigment, a magenta pigment, a blue pigment, a green pigment, a red pigment, and any combination thereof.

In another aspect of the invention, there is provided a sol-gel digital inkjet printing method, for forming a transparent colorless or color pattern on a substrate, the method comprises:

patterning by inkjet printing an amount of a formulation of the invention (a clear formulation or a color formulation) onto a surface region of the substrate; and inducing crosslinking of the polymer present in the formulation to form the clear (transparent) or color pattern on the substrate.

In some embodiments, crosslinking is induced by dehydration. In some embodiments, crosslinking is induced by the presence of an acid or a base or at least one organometallic material in the formulation. Where the acid or base is a latent compound, as defined, the acid or base may be obtained by converting the latent acid or base to the acid or base, thereby inducing crosslinking.

In some embodiments, the formulation is patterned in full, namely the patterning is of a formulation comprising:

at least one low-temperature curing, self-crosslinking silanol functionalized polymer, at least one (aqueous) catalyst formulation comprising an acid or a base and formulated to have a pH between 2 and 8; or at least one (solidified) catalyst formulation comprising an anti-bleeding polymer and a salt or formulated as a liquid and dried on top of the substrate; and an aqueous carrier.

In some embodiments, such a formulation may further comprise an additive, as disclosed herein, such as glycol ether co-solvent (PG) and a wetting agent (Dynol 365).

In some embodiments, the formulation may comprise at least one additional functional agent or material that provides an improvement of any one parameter associated with the printing process and/or the pattern obtained.

In some embodiments, the method comprises patterning by inkjet printing the at least one low-temperature curing self-crosslinking polymer, followed by ink jetting the at least one aqueous surface catalyst formulation onto the patterned polymer.

In some embodiments, the method comprises patterning by inkjet printing the at least one aqueous catalyst formulation, followed by inkjetting the low-temperature curing, silanol activated, self-crosslinking polymer onto the patterned catalyst formulation.

Crosslinking is achieved thermally by exposing the pattern to an IR source or to any heating element such that a temperature between room temperature and 80° C. is achieved. In some embodiments, the temperature is below 70° C., below 60° C., below 50° C., below 40° C., below 30° C. or at a temperature between room temperature (20-35° C.) and 80° C. In some embodiments, the temperature is lower than 50±5° C.

In another aspect of the invention, the method of the invention is for enhancing a pre-formed pattern on a substrate. For such applications, a formulation of the invention is ink jetted, as detailed herein, on a pre-formed object, pattern or image present on the substrate and the formulation is allowed to cure. Thus, for such applications, the method is for enhancing a pre-formed pattern, or for forming a 3D pattern on a pre-formed pattern, the method comprises:
 ink jetting an amount of a formulation of the invention onto a surface region of a pre-formed pattern; and
 inducing crosslinking of the polymer present in the formulation to form a coating or 3D structure on the pre-formed pattern.

In some embodiments, the at least one low-temperature curing self-crosslinking polymer is ink jetted first, followed by ink jetting of the at least one aqueous catalyst formulation onto the patterned polymer.

In some embodiments, the at least one aqueous catalyst formulation is ink jetted first, followed by ink jetting the low-temperature curing, self-crosslinking silanol functionalized polymer onto the patterned catalyst formulation.

The invention further provides a method of printing an ink formulation on a pretreated solid and dry surface, the method comprising
 pre-treating a surface region with a catalyst formulation of the invention, the catalyst formulation being selected from a liquid formulation that has been applied and subsequently dried or a solid formulation that has been applied in a solid or in a formulation form and subsequently dried; and
 forming an ink pattern with an ink formulation of the invention on the pretreated surface region.

The methods of the invention may be used for producing embossed patterns.

The printing runs may be repeated one or more times to achieve a pattern having a desired thickness, such that the thickness of the printed pattern is determined (or directionally proportional) to the number of printing runs. In other words, any of the methods of the invention may be carried out such that in a first run—a first amount of the ink is ink jetting onto a surface region of a substrate and thereafter is optionally allowed or induced to crosslink, as disclosed herein. Thereafter, in a second run—a second amount of the ink is ink jetted on the crosslinked pattern (or where the first formed pattern is not crosslinked—on the uncured pattern) and the pattern is optionally allowed to crosslink. This may be repeated once again to afford a pattern of a predefined thickness or a 3D structure.

The number of runs that may be performed is unlimited and may vary from 1 to several hundred. Unlike other formulations and methodologies of printing, patterns and 3D objects formed by printing a formulating according to the invention are characterized by well defined, sharp boundaries/edges, exhibiting minimal or no bleeding.

In view of the low temperatures that are used to induce crosslinking and curing, the pattern may be formed on any substrate material. The substrate may thus be of a heat-sensitive flexible material or may comprise such materials. Non-limiting examples of such substrates include, leather, and various films and plastics, especially olefin films that are surface treated, such as Nylon and PET, paper or paper products, natural or synthetic fibers, flexible packaging materials, plastic or synthetic materials, textiles made from natural or synthetic materials, glass, metallic materials and others.

In some embodiments, the substrate is a dyed substrate is an untreated substrate that is optionally a fabric. In some embodiments, the dyed substrate is a fabric that includes dyed synthetic fibers. According to some embodiments, the synthetic fibers are selected from polyester fibers, polyurethane fibers, polyamide fibers, polyacryl fibers, polyolefin fibers, Rayon fibers, Vinyon fibers, Saran fibers and Spandex fibers.

The substrate may be a functional substrate or a surface, namely a substrate or a surface of an external packaging of a product, such as a food product or a medicament, which are regulated. As formulations according to the invention as well as printed patterns are non-toxic, formulations according to the invention may be used to produce patterns on surface regions of food packaging and other packaging materials under regulation. Formulations of the invention, for example, meet the Swiss regulation for indirect food packaging (Swiss Ordinance for indirect food contact).

Methods of the invention are implemented by digital printing, e.g., inkjet printing. Inkjet printing forms a digital image by propelling droplets of an ink onto a substrate. Two main technologies that are in use are continuous and Drop-on-demand (DOD). Drop on demand is a broad classification of inkjet printing technologies where drops are ejected from the print head only when required. The drops of ink are typically projected directly onto an ink receptor surface, for example a substrate or a pre-formed coating or pattern, without physical contact between the printing device and the receptor. Typically, one or more printheads are used to deposit the droplets on the coating. The printing device typically stores the printing data electronically and controls a mechanism for ejecting the drops image-wise. Printing may be accomplished by moving a print head across the receptor or vice versa.

Any ink formulation of the invention is suitable for application in a digital inkjet printing device.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
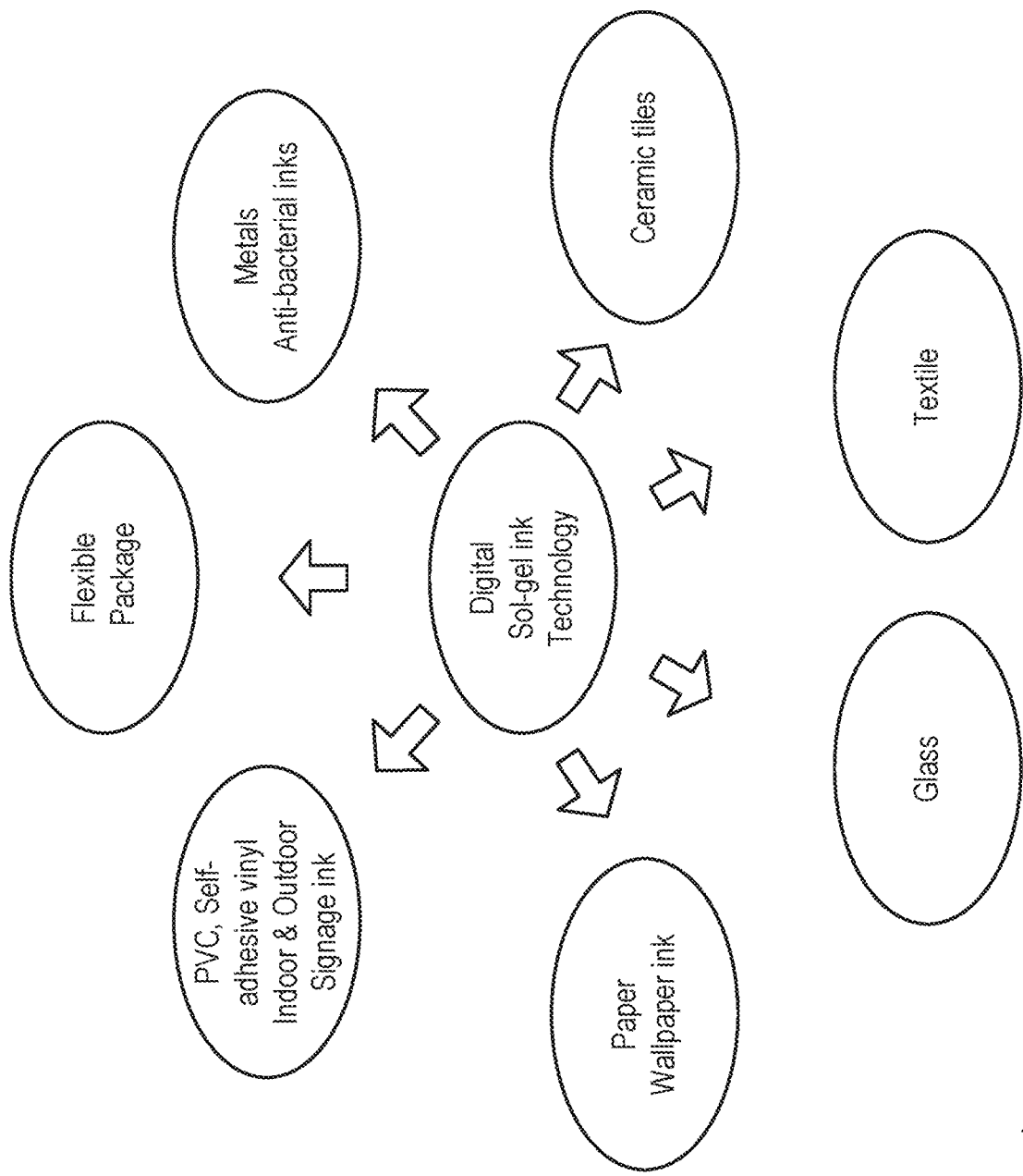
FIG. 1 provides a pictorial description of uses and applications of ink formulations according to the invention.
Figure 2:
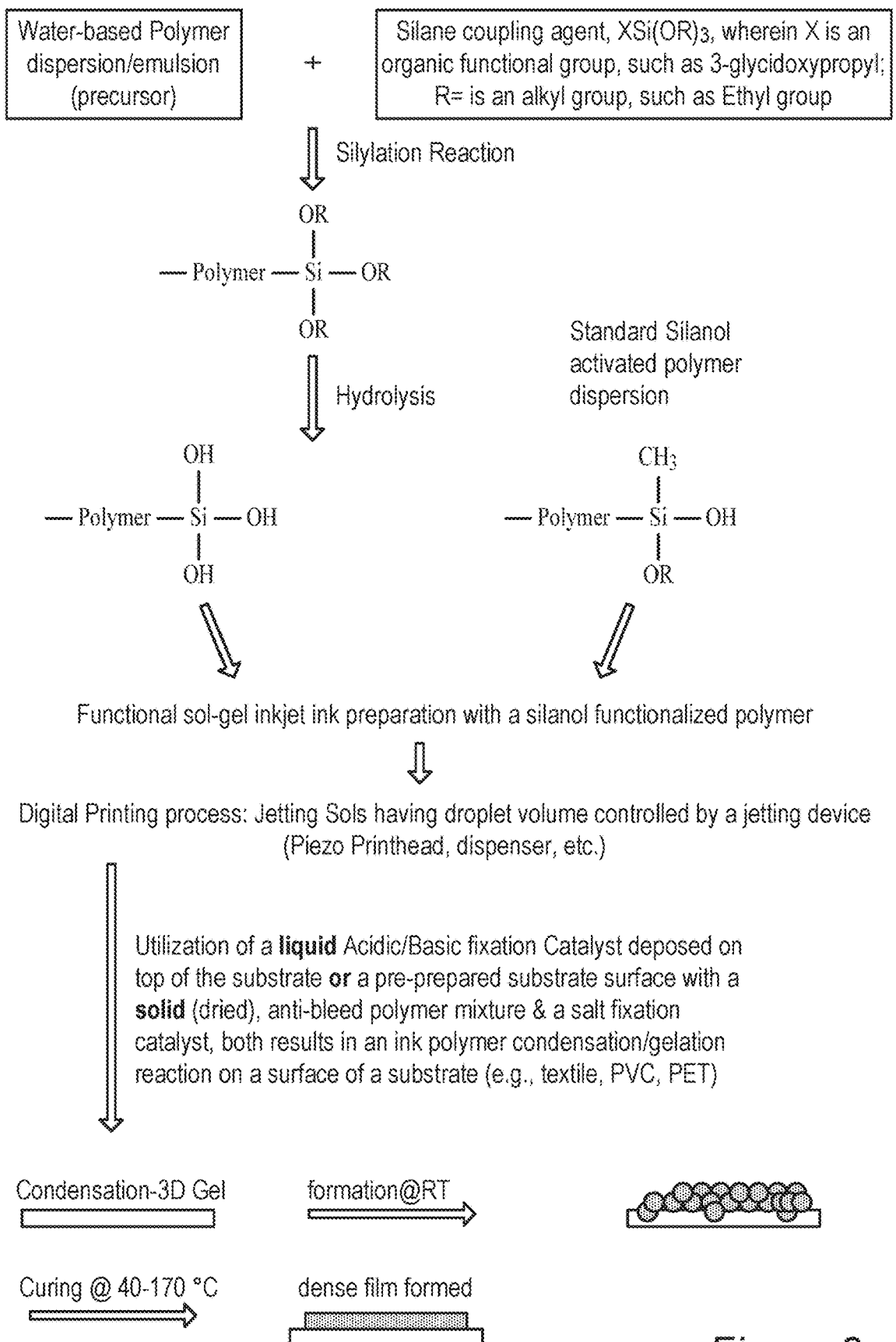
FIG. 2 depicts a general scheme for the preparation of digital sol-gel inkjet inks according to the invention.

Formulations of the invention, such as those listed in Tables 1-12 have been prepared and have been printed on a variety of surfaces. In some instances, the surface was a dry surface made of a polymeric material, a plastic, a textile and others, and in some cases printing was achieved on a wet surface.

Also, in some runs, the catalyst formulation was printed ahead of the ink formulation. The catalyst formulation was either allowed to dry prior to application of the ink formulation or was maintained wet or partially wet when the ink formulation was applied.

As stated above, printing of formulations of the invention provided stable and un-deformable patterns on the variety of surfaces. In contrast, where a polymer was present in the pigment formulation the pattern sensitivity to external stress was dramatically increased. However, in formulations of the invention, where such a polymer was absent, mechanical deformations were prevented or minimized.

Also, the low temperature curing was found superior when using the complex systems involving latent acids/bases or anti-bleedings systems were used. Both allowed for the formation of strong, un-peelable and un-deformable patterns.

The invention claimed is:

1. A sol-gel digital inkjet printing process for forming a dry pre-treatment pattern on a surface region, the process comprising (1) applying a formulation on the surface region, the formulation being an ink set formulation comprising (a) at least one low-temperature curing self-crosslinking polymer which is a silanol functionalized polymer selected amongst polymers or pre-polymers having a $T_g$ value in the range of −70° C. to 400° C., when measured on the dry printed pattern, and (b) a catalyst in the form of an anti-bleeding polymer in combination with at least one salt; wherein said applying being under conditions permitting formation of particles formed of the silanol functionalized polymer, and (2) curing said particles to form a continuous pattern.

2. The sol-gel digital inkjet printing process according to claim 1, wherein the at least one low-temperature curing self-crosslinking polymer selected from silanol functionalized polymer is fully silanol functionalize polymer.

3. The process according to claim 1, for enhancement of a printed pattern, or for providing a 3D enhanced pattern.

4. The process according to claim 1, wherein the silanol functionalized polymer is selected to undergo curing via low temperature crosslinking.

5. The process according to claim 4, wherein the low temperature being a temperature between room temperature and 110° C.

6. The process according to claim 1, wherein the silanol functionalized polymer is selected amongst acidic pH-reactive polymers and basic pH-reactive polymers.

7. The process according to claim 1, wherein the silanol functionalized polymer is selected amongst ether-polyols, ester-polyols and carbonate-polyols, poly ethers, water based acrylics, epoxy polymers, phenolic polymers, polyamide, polyamines, micronized polyethylene waxes and polyurethane.

8. The process according to claim 1, wherein the silanol functionalized polymer is a polyurethane polymer or an acrylic polymer.

9. The process according to claim 1, wherein the ink formulation is formulated as an aqueous formulation comprising water and/or a water-miscible organic solvent.

10. A colored inkjet ink formulation comprising a pigment, a fully silanol functionalized polymer, and a carrier, wherein the fully silanol functionalized polymer undergoes crosslinking upon contacting with an anti-bleeding polymer in combination with at least one salt, and wherein upon contacting the fully silanol functionalized polymer with the anti-bleeding polymer and at least one salt, the viscosity increases to afford 3-dimensional gelation.

11. The ink according to claim 10, wherein the fully silanol functionalized polymer is a fully silanol functionalized polyurethane, wherein the number of hydroxyl groups in the silanol group is at least one.

12. A method of inkjet printing a color pattern on a substrate, the method comprises:
patterning by inkjet printing an amount of a formulation according to claim 1 onto a dry surface region of the substrate having been treated with a catalyst formulation comprising an antibleeding polymer and at least one salt; and
inducing crosslinking of the fully silanol functionalized polymer in the formulation to form a colored pattern on the substrate.

13. The method according to claim 12, wherein the substrate is of a material selected from leather, polymeric surfaces, paper or paper products, natural or synthetic fibers, flexible packaging materials, plastic or synthetic materials, textiles made from natural or synthetic materials, glass, and metallic materials.

14. The method according to claim 12, wherein the anti-bleeding polymer is a polyurethane, a cellulosic material, or a polyacrylate.

15. The method according to claim 12, wherein at least one salt is a sodium salt, an aluminum salt, a copper salt, a zinc salt, a cobalt salt, a nickel salt, a magnesium salt, an ammonium salt or a calcium salt.

16. The process according to claim 1, wherein the anti-bleeding polymer is a polyurethane, a cellulosic material or a polyacrylate.

17. The process according to claim 1, wherein the at least one salt is a sodium salt, an aluminum salt, a copper salt, a zinc salt, a cobalt salt, a nickel salt, a magnesium salt, an ammonium salt or a calcium salt.

18. A sol-gel digital inkjet printing process for forming a dry pre-treatment pattern on a surface region for enhancement of a printed pattern, or for providing a 3D enhanced pattern, the process comprising (1) applying a formulation on the surface region, the formulation being an ink set formulation comprising (a) at least one low-temperature curing self-crosslinking polymer which is a silanol functionalized polymer, and (b) a catalyst in the form of an anti-bleeding polymer in combination with at least one salt; wherein said applying being under conditions permitting formation of particles formed of the silanol functionalized polymer, and (2) curing said particles to form a continuous pattern.

* * * * *